United States Patent
Engquist et al.

(10) Patent No.: US 8,135,751 B2
(45) Date of Patent: *Mar. 13, 2012

(54) DISTRIBUTED COMPUTING SYSTEM HAVING HIERARCHICAL ORGANIZATION

(75) Inventors: James D. Engquist, Colorado Springs, CO (US); Craig A. Vosburgh, Colorado Springs, CO (US); Brian Berliner, San Jose, CA (US); Jerry R. Jackson, Colorado Springs, CO (US); Craig A. Lindley, Colorado Springs, CO (US); Doreen E. Collins, Monument, CO (US); Jonathan D. Nordby, Monument, CO (US); Dann M. Church, Castle Rock, CO (US); David L. Resch, Colorado Springs, CO (US)

(73) Assignee: Computer Associates Think, Inc., Islandia, NY (US)

( * ) Notice: Subject to any disclaimer, the term of this patent is extended or adjusted under 35 U.S.C. 154(b) by 82 days.

This patent is subject to a terminal disclaimer.

(21) Appl. No.: 12/729,947

(22) Filed: Mar. 23, 2010

(65) Prior Publication Data

US 2010/0241741 A1    Sep. 23, 2010

Related U.S. Application Data

(63) Continuation of application No. 11/070,851, filed on Mar. 2, 2005, now Pat. No. 7,590,653, and a continuation of application No. 12/559,310, filed on Sep. 14, 2009.

(51) Int. Cl.
G06F 7/00 (2006.01)
G06F 17/30 (2006.01)

(52) U.S. Cl. .................................... 707/794; 709/223
(58) Field of Classification Search .................. None
See application file for complete search history.

(56) References Cited

U.S. PATENT DOCUMENTS

| 5,049,873 A | 9/1991 | Robins et al. |
| 5,715,396 A | 2/1998 | Chatwani et al. |
| 5,751,967 A | 5/1998 | Raab et al. |

(Continued)

FOREIGN PATENT DOCUMENTS

WO    WO/03/085526    10/2003

OTHER PUBLICATIONS

"Cisco IOS", Dec. 15, 2005, Wikipedia, Wayback Machine, p. 1-5.*

(Continued)

*Primary Examiner* — Pierre Vital
*Assistant Examiner* — Augustine Obisesan
(74) *Attorney, Agent, or Firm* — Baker Botts L.L.P.

(57) ABSTRACT

A distributed computing system conforms to a multi-level, hierarchical organizational model. One or more control nodes provide for the efficient and automated allocation and management of computing functions and resources within the distributed computing system in accordance with the organization model. The model includes four distinct levels: fabric, domains, tiers and nodes that provide for the logical abstraction and containment of the physical components as well as system and service application software of the enterprise. A user, such as a system administrator, interacts with the control nodes to logically define the hierarchical organization of distributed computing system. The control nodes are responsible for all levels of management in accordance with the model, including fabric management, domain creation, tier creation and node allocation and deployment.

21 Claims, 13 Drawing Sheets

U.S. PATENT DOCUMENTS

| | | | |
|---|---|---|---|
| 5,774,377 A | 6/1998 | Eidson et al. | |
| 5,819,281 A | 10/1998 | Cummins | |
| 5,941,978 A * | 8/1999 | Finni | 712/28 |
| 5,956,515 A | 9/1999 | Beals et al. | |
| 6,018,747 A | 1/2000 | Burns et al. | |
| 6,115,713 A * | 9/2000 | Pascucci et al. | 1/1 |
| 6,134,594 A | 10/2000 | Helland et al. | |
| 6,202,091 B1 | 3/2001 | Godse | |
| 6,226,788 B1 | 5/2001 | Schoening et al. | |
| 6,259,448 B1 | 7/2001 | McNalley et al. | |
| 6,282,568 B1 * | 8/2001 | Sondur et al. | 709/223 |
| 6,334,146 B1 * | 12/2001 | Parasnis et al. | 709/217 |
| 6,430,622 B1 | 8/2002 | Aiken et al. | |
| 6,442,547 B1 * | 8/2002 | Bowman-Amuah | 379/221.14 |
| 6,484,261 B1 * | 11/2002 | Wiegel | 726/11 |
| 6,532,465 B2 | 3/2003 | Hartley et al. | |
| 6,535,915 B1 | 3/2003 | Valys et al. | |
| 6,535,977 B1 | 3/2003 | Holle et al. | |
| 6,549,943 B1 * | 4/2003 | Spring | 709/223 |
| 6,711,613 B1 | 3/2004 | Ewing et al. | |
| 6,754,703 B1 * | 6/2004 | Spring | 709/223 |
| 6,775,423 B2 | 8/2004 | Kulkarni et al. | |
| 6,775,829 B1 | 8/2004 | Kroening | |
| 6,847,993 B1 | 1/2005 | Novaes et al. | |
| 6,865,737 B1 | 3/2005 | Lucas et al. | |
| 6,912,221 B1 * | 6/2005 | Zadikian et al. | 370/395.21 |
| 6,920,493 B1 | 7/2005 | Schwab | |
| 6,944,662 B2 | 9/2005 | Devine et al. | |
| 7,055,040 B2 | 5/2006 | Klemba et al. | |
| 7,203,731 B1 | 4/2007 | Coates et al. | |
| 2002/0156877 A1 | 10/2002 | Lu et al. | |
| 2002/0161751 A1 | 10/2002 | Mulgund et al. | |
| 2003/0036875 A1 * | 2/2003 | Peck et al. | 702/127 |
| 2003/0051020 A1 | 3/2003 | Kadam et al. | |
| 2003/0061344 A1 | 3/2003 | Monroe | |
| 2003/0084052 A1 * | 5/2003 | Peterson | 707/100 |
| 2003/0084156 A1 | 5/2003 | Graupner et al. | |
| 2003/0097425 A1 * | 5/2003 | Chen | 709/220 |
| 2003/0097438 A1 | 5/2003 | Bearden et al. | |
| 2003/0120780 A1 | 6/2003 | Zhu et al. | |
| 2003/0126265 A1 | 7/2003 | Aziz et al. | |
| 2003/0131078 A1 | 7/2003 | Scheer et al. | |
| 2003/0140282 A1 | 7/2003 | Kaler et al. | |
| 2003/0177176 A1 | 9/2003 | Hirschfeld et al. | |
| 2003/0195957 A1 | 10/2003 | Banginwar | |
| 2003/0229792 A1 | 12/2003 | Baldwin et al. | |
| 2004/0088694 A1 | 5/2004 | Ho | |
| 2004/0103193 A1 | 5/2004 | Pandya et al. | |
| 2004/0123141 A1 | 6/2004 | Yadav | |
| 2004/0162741 A1 | 8/2004 | Flaxer et al. | |
| 2004/0181794 A1 | 9/2004 | Coleman et al. | |
| 2004/0187104 A1 | 9/2004 | Sardesai et al. | |
| 2004/0201611 A1 | 10/2004 | Bagsby | |
| 2004/0253956 A1 | 12/2004 | Collins | |
| 2004/0260734 A1 | 12/2004 | Ren et al. | |
| 2005/0005200 A1 | 1/2005 | Matena et al. | |
| 2005/0027831 A1 | 2/2005 | Anderson et al. | |
| 2005/0027865 A1 * | 2/2005 | Bozak et al. | 709/226 |
| 2005/0091227 A1 | 4/2005 | McCollum et al. | |
| 2005/0091348 A1 | 4/2005 | Ferri et al. | |
| 2005/0193265 A1 | 9/2005 | Lin et al. | |
| 2005/0246301 A1 | 11/2005 | Lin et al. | |
| 2006/0015773 A1 * | 1/2006 | Singh et al. | 714/13 |
| 2006/0047789 A1 | 3/2006 | Kumar et al. | |
| 2006/0173856 A1 | 8/2006 | Jackson et al. | |
| 2006/0173857 A1 | 8/2006 | Jackson | |
| 2006/0173895 A1 | 8/2006 | Engquist et al. | |
| 2006/0173994 A1 | 8/2006 | Emeis et al. | |
| 2006/0179106 A1 * | 8/2006 | Turner et al. | 709/201 |
| 2006/0200494 A1 | 9/2006 | Sparks | |
| 2007/0233698 A1 * | 10/2007 | Sundar et al. | 707/10 |
| 2008/0177821 A1 * | 7/2008 | Tsao | 709/201 |
| 2008/0215734 A1 * | 9/2008 | Walker et al. | 709/226 |
| 2010/0262467 A1 * | 10/2010 | Barnhill et al. | 705/10 |

OTHER PUBLICATIONS

Brown et al., "Cisco Cookbook", Jul. 1, 2003, O'Reilly & Associates, Inc., First edition, Safari Books Online, p. 2-11.*

Office Action dated Jan. 2, 2008, for U.S. Appl. No. 11/176,161 (21 pages).

Office Action dated Jan. 2, 2008, for U.S. Appl. No. 11/191,384 (30 pages).

"Automated Discovery and Inventory of Nodes Wtihin an Autonomic Distributed Computing System" U.S. Appl. No. 11/070,851, filed Mar. 2, 2005.

Notification of Transmittal of the International Search Report and wRitten Opinion from corresponding PCT Appln, Ser. No. PCT/US2006/003448 mailed Jul. 18, 2006, 13 pages.

"Management of Software Images for Computing Nodes of a Distributed Computing System", U.S. Appl. No. 11/046,133, filed Jan. 28, 2005.

"Updating Software Images Associated with a Distributed Computing System" U.S. Appl. No. 11/046,152, filed Jan. 28, 2005.

E.N. Herness et al., "WebSphere Application Server: A Foundation for On Demand Computing", IBM Systems Journal IBM, vol. 43, No. 2, pp. 213-237, 2004.

Notification of Transmittal of the International Search Report and Written Opinion from corresponding PCT Appln. Ser. No. PCT/US2006/003436 mailed Jul. 18, 2006, 14 pages.

Notification of Transmittal of the International Search Report and Written Opinion from corresponding PCT Appln. Ser. No. PCT/US2006/003439 mailed Jul. 18, 2006, 14 pages.

Notification of Transmittal of the International Search Report and Written Opinion from corresponding PCT Appln. Ser. No. PCT/US2006/003437 mailed Jul. 20, 2006, 13 pages.

Notification of Transmittal of the International Search Report and Written Opinion from corresponding PCT Appln. Ser. No. PCT/US2006/003028 mailed Jul. 18, 2006, 14 pages.

B. Urgaonkar et al., "Resource Overbooking and Application Profiling in Shared Hosting Platforms", Proceedings of the 5th Symposium on Operating Systems and Design and Implementation, pp. 239-254, 2002.

G. Lodi et al., "QoS-aware Clustering of Application Servers," Proceedings of the 1st IEEE Workship on quality of Service for Application Servers, in conjunction with the 23rd International Synmposium on Reliable Distributed Systems, 3 pages, Oct. 17, 2004.

"Cisco IOS" Dec. 15, 2005, Wikipedia, Wayback Machine, pp. 1-5.

Brown et al., "Cisco Cookbook" Jul. 1, 2003 O'Reilly & Associates, Inc. First edition, Safari Books Online, pp. 2-11.

International Preliminary Report on Patentability from corresponding PCT Appln. Ser. No. PCT/US2006/003436 mailed Aug. 9, 2007 (9 pages).

Office Action dated Sep. 14, 2007 for U.S. Appl. No. 11/070,851 (22 pages).

*Preinstalling Microsoft Windows XP by Using the OEM Preinstallation Kit, Part 1.* XP-002301441, Apr. 4, 2003, 24 pages.

R. Mark Koan et al., *It Takes a Village to Build an Image,* XP-002384269, 2003, pp. 200-207.

Office Action dated Aug. 8, 2007 for U.S. Appl. No. 11/176,161 (29 pages).

Office Action dated Oct. 4, 2007 for U.S. Appl. No. 11/046,133 (19 pages).

Office Action dated Oct. 2, 2007 for U.S. Appl. No. 11/191,882 (27 pages).

Office Action dated Mar. 24, 2008 for U.S. Appl. No. 11/070,851 (28 pages).

Office Action dated Apr. 7, 2008 for U.S. Appl. No. 11/046,152 (25 pages).

Office Action dated Apr. 18, 2008 for U.S. Appl. No. 11/074,291 (33 pages).

Office Action dated May 1, 2008 for U.S. Appl. No. 11/191,882 (33 pages).

Office Action dated May 2, 2008 for U.S. Appl. No. 11/046,133 (24 pages).

Office Action dated Jul. 21, 2008 for U.S. Appl. No. 11/191,384 (34 pages).

Office Action dated May 1, 2009 for U.S. Appl. No. 11/074,291 (8 pages).
Notice of Allowance dated Jul. 16, 2008 for U.S. Appl. No. 11/176,161 (10 pages).
Notice of Allowance dated Oct. 10, 2008 for U.S. Appl. No. 11/191,384 (9 pages).
Notice of Allowance dated Mar. 17, 2009 for U.S. Appl. No. 11/191,882 (16 pages).
Notice of Allowance dated Nov. 26, 2008 for U.S. Appl. No. 11/046,133 (4 pages).
Notice of Allowance dated Apr. 13, 2009 for U.S. Appl. No. 11/070,851 (18 pages).
Office Action dated Apr. 3, 2009 for U.S. Appl. No. 11/046,152 (24 pages).
U.S. Appl. No. 12/559,310, filed Sep. 14, 2009 entitled "Automated Discovery and Inventory of Nodes Within an Autonomic Distributed Computing System", Engquist et al.
Office Action dated Sep. 19, 2008 for U.S. Appl. No. 11/074,291 (36 pages).
Office Action dated Oct. 6, 2008 for U.S. Appl. No. 11/191,882 (34 pages).
Office Action dated Oct. 17, 2008 for U.S. Appl. No. 11/046,152 (29 pages).
Office Action dated Sep. 26, 2008 for U.S. Appl. No. 11/070,851 (10 pages).

\* cited by examiner

Cassatt Collage Controller 3.0 http://localhost:8090/local/logAlertsList.spr local proto  cvs proto  local spec  Bugzilla  da  Cassatt collage Cont...

Cassatt Collage 3.0

You are logged in as: admin  LOGOUT

*Domain*
☐ Collage Domain

*Tiers*
☐ Test Tier 1 (2)
☐ Test Tier 2 (2)
☐ Test Tier 3 (2)

*Pools*
○ Discovered Pool (1)
☐ Free Pool (0)
☐ Maintenance Pool (0)

*Logs*
Alerts Log (0)
Control Node Log (txt)

*Reports*
Action History
Hardware Inventory
Image Utilization

*Images*

*Users*

Logs

Alerts Log: Alerts caused by service level breaches, hardware failures or manual power notifications.

Alerts Log (0)

| No | ▽ | Severity - All | ▽ | Event - All | ▽ | Object - All | ▽ | FILTER |
|---|---|---|---|---|---|---|---|---|
| ☑ | | Severity | | Acknowledged | Object | Event | State | User | Date |

Log Actions ▽

192

Contents copyright ©2004 Cassatt Corporation

Done

DISTRIBUTED COMPUTING SYSTEM HAVING HIERARCHICAL ORGANIZATION

CROSS REFERENCE TO RELATED APPLICATIONS

This application is a continuation of U.S. patent application Ser. No. 11/070,851 filed Mar. 2, 2005 now U.S. Pat. No. 7,590,653 by Applicants and entitled "AUTOMATED DISCOVERY AND INVENTORY OF NODES WITHIN AN AUTONOMIC DISTRIBUTED COMPUTING SYSTEM" and U.S. patent application Ser. No. 12/559,310 filed Sep. 14, 2009 by Applicants and entitled "AUTOMATED DISCOVERY AND INVENTORY OF NODES WITHIN AN AUTONOMIC DISTRIBUTED COMPUTING SYSTEM".

TECHNICAL FIELD

The invention relates to computing environments and, more specifically, to distributed computing systems.

BACKGROUND

Distributed computing systems are increasingly being utilized to support high-performance computing applications. Typically, distributed computing systems are constructed from a collection of computing nodes that combine to provide a set of processing services to implement the high performance computing applications. Each of the computing nodes in the distributed computing system is typically a separate, independent computing device interconnected with each of the other computing nodes via a communications medium, e.g., a network.

One challenge with distributed computing systems is the organization, deployment and administration of such a system within an enterprise environment. For example, it is often difficult to manage the allocation and deployment of enterprise computing functions within the distributed computing system. An enterprise, for example, often includes several business groups, and each group may have competing and variable computing requirements.

SUMMARY

In general, the invention is directed to a distributed computing system conforms to a multi-level, hierarchical organizational model. One or more control nodes provide for the efficient and automated allocation and management of computing functions and resources within the distributed computing system in accordance with the organization model.

As described herein, the model includes four distinct levels: fabric, domains, tiers and nodes that provide for the logical abstraction and containment of the physical components as well as system and service application software of the enterprise. A user, such as a system administrator, interacts with the control nodes to logically define the hierarchical organization of distributed computing system. The control nodes are responsible for all levels of management in accordance with the model, including fabric management, domain creation, tier creation and node allocation and deployment.

In one embodiment, a method comprises receiving input that defines a model for a hierarchical organization of a distributed computing system having a plurality of computing nodes. The model specifies a fabric having a one or more domains, and wherein each domain has at least one tier that includes at least one node slot. The method further comprises automatically configuring the distributed computing system in accordance with the hierarchical organization defined by the model.

In another embodiment, a method comprises receiving input defining an organization model for a distributed computing system. The model includes a plurality of tiers that, represent different computing functions, and defines a priority and computing node requirements for each of the tiers. The method further comprises assigning unallocated computing nodes to the tiers from a free pool based on the priority and computing requirements for each of the tiers.

In another embodiment, a distributed computing system comprises a plurality of application nodes interconnected via a communications network, and a database that stores a hierarchical model for the distributed computing system. The model specifies a fabric having one or more domains, and wherein each domain has at least one tier that includes one or more node slots. The distributed computing system further comprises a control node that automatically configures the application nodes in accordance with the hierarchical organization defined by the model.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 11 is a screen illustration of an exemplary user interface for viewing a hardware inventory report.

FIG. 12 is a screen illustration of an exemplary user interface for viewing discovered nodes that are located in the free pool.

FIG. 13 is a screen illustration of an exemplary user interface for viewing users of distributed computing system.

FIG. 14 is a screen illustration of an exemplary user interface for viewing alerts for distributed computing system.

DETAILED DESCRIPTION

Figure 1:
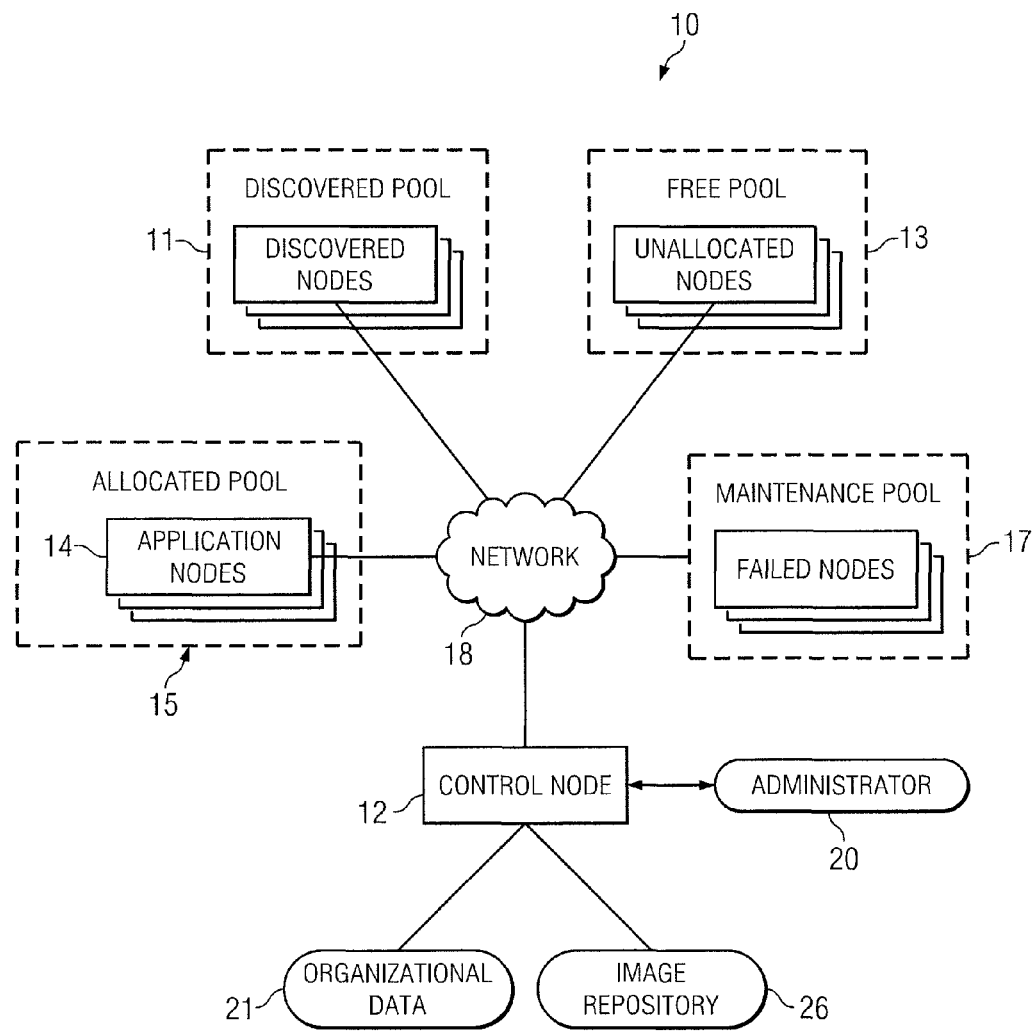
FIG. 1 is a block diagram illustrating a distributed computing system constructed from a collection of computing nodes.

FIG. 1 is a block diagram illustrating a distributed computing system 10 constructed from a collection of computing nodes. Distributed computing system 10 may be viewed as a collection of computing nodes operating in cooperation with each other to provide high-performance processing.

In the illustrated example, the collection of computing nodes forming distributed computing system 10 are logically grouped within a discovered pool 11, a free pool 13, an allocated pool 15 and a maintenance pool 17. In addition, distributed computing system 10 includes at least one control node 12.

Within distributed computing system 10, a computing node refers to the physical computing device. The number of computing nodes needed within distributed computing system 10 is dependent on the processing requirements. For example, distributed computing system 10 may include 8 to 512 computing nodes or more. Each computing node includes one or more programmable processors for executing software instructions stored on one or more computer-readable media.

Discovered pool 11 includes a set of discovered nodes that have been automatically "discovered" within distributed computing system 10 by control node 12. For example, control node 12 may sense dynamic host communication protocol (DHCP) requests or other communications to detect the connection of a discovered node to network 18. Once detected, control node 12 automatically inventories the attributes for the discovered node and reassigns the discovered node to free pool 13. The node attributes identified during the inventory process may include a CPU count, a CPU speed, an amount of memory (e.g., RAM), local disk characteristics or other computing resources. Control node 12 may also receive input identifying node attributes not detectable via the automatic inventory, such as whether the node includes I/O, such as HBA.

Free pool 13 includes a set of unallocated nodes that are available for use within distributed computing system 10. Control node 12 may dynamically reallocate an unallocated node from free pool 13 to allocated pool 15 as an application node 14. For example, control node 12 may use unallocated nodes from free pool 13 to replace a failed application node 14 or to add an application node to allocated pool 15 to increase processing capacity of distributed computing system 10.

In general, allocated pool 15 includes application nodes 14 that are currently providing a computing environment for execution of user software applications. In addition, although not illustrated separately, application nodes 14 may include one or more input/output (I/O) nodes. Application nodes 14 typically have more substantial I/O capabilities than control node 12, and are typically configured with more computing resources (e.g., processors and memory). Maintenance pool 17 includes a set of nodes that either could not be inventoried or that failed and have been taken out of service from allocated pool 15.

Control node 12 provides the system support functions for managing distributed computing system 10. More specifically, control node 12 manages the roles of each computing node within distributed computing system 10 and the execution of software applications within the distributed computing system. In general, distributed computing system 10 includes at least one control node 12, but may utilize additional control nodes to assist with the management functions.

Other control nodes 12 (not shown in FIG. 1) are optional and may be associated with a different subset of the computing nodes within distributed computing system 10. Moreover, control node 12 may be replicated to provide primary and backup administration functions, thereby allowing for graceful handling a failover in the event control node 12 fails.

Network 18 provides a communications interconnect for control node 12 and application nodes 14, as well as discovered nodes, unallocated nodes and failed nodes. Communications network 18 permits internode communications among the computing nodes as the nodes perform interrelated operations and functions. Communications network 18 may comprise, for example, direct connections between one or more of the computing nodes, one or more customer networks maintained by an enterprise, local area networks (LANs), wide area networks (WANs) or a combination thereof. Communications network 18 may include a number of switches, routers, firewalls, load balancers, and the like.

In one embodiment, each of the computing nodes within distributed computing system 10 executes a common general-purpose operating system. One example of a general-purpose operating system is the Windows™ operating system provided by Microsoft Corporation. In some embodiments, the general-purpose operating system such as the Linux kernel.

In the example of FIG. 1, control node 12 is responsible for software image management. The term "software image" refers to a complete set of software loaded on an individual computing node, including the operating system and all boot code, middleware and application files. System administrator 20 may interact with control node 12 and identify the particular types of software images to be associated with application nodes 14. Alternatively, administration software executing on control node 12 may automatically identify the appropriate software images to be deployed to application nodes 14 based on the input received from system administrator 20. For example, control node 12 may determine the type of software image to load onto an application node 14 based on the functions assigned to the node by system administrator 20. Application nodes 14 may be divided into a number of groups based on their assigned functionality. As one example, application nodes 14 may be divided into a first group to provide web server functions, a second group to provide business application functions and a third group to provide database functions. The application nodes 14 of each group may be associated with different software images.

Control node 12 provides for the efficient allocation and management of the various software images within distributed computing system 10. In some embodiments, control node 12 generates a "golden image" for each type of software image that may be deployed on one or more of application nodes 14. As described herein, the term "golden image" refers to a reference copy of a complete software stack.

System administrator 20 may create a golden image by installing an operating system, middleware and software applications on a computing node and then making a complete copy of the installed software. In this manner, a golden image may be viewed as a "master copy" of the software image for a particular computing function. Control node 12 maintains a software image repository 26 that stores the golden images associated with distributed computing system 10.

Control node 12 may create a copy of a golden image, referred to as an "image instance," for each possible image instance that may be deployed within distributed computing system 10 for a similar computing function. In other words, control node 12 pre-generates a set of K image instances for a golden image, where K represents the maximum number of image instances for which distributed computing system 10 is configured for the particular type of computing function. For a given computing function, control node 12 may create the complete set of image instance even if not all of the image instances will be initially deployed. Control node 12 creates different sets of image instances for different computing functions, and each set may have a different number of image instances depending on the maximum number of image instances that may be deployed for each set. Control node 12 stores the image instances within software image repository 26. Each image instance represents a collection of bits that may be deployed on an application node.

Further details of software image management are described in co-pending U.S. patent application Ser. No. 11/046,133, entitled "MANAGEMENT OF SOFTWARE IMAGES FOR COMPUTING NODES OF A DISTRIBUTED COMPUTING SYSTEM," filed Jan. 28, 2005 and co-pending U.S. patent application Ser. No. 11/046,152, entitled "UPDATING SOFTWARE IMAGES ASSOCIATED WITH A DISTRIBUTED COMPUTING SYSTEM," filed Jan. 28, 2005, each of which is incorporated herein by reference.

In general, distributed computing system 10 conforms to a multi-level, hierarchical organizational model that includes four distinct levels: fabric, domains, tiers and nodes. Control node 12 is responsible for all levels of management, including fabric management, domain creation, tier creation and node allocation and deployment.

As used herein, the "fabric" level generally refers to the logical constructs that allow for definition, deployment, partitioning and management of distinct enterprise applications. In other words, fabric refers to the integrated set of hardware, system software and application software that can be "knitted" together to form a complete enterprise system. In general, the fabric level consists of two elements: fabric components or fabric payload. Control node 12 provides fabric management and fabric services as described herein.

In contrast, a "domain" is a logical abstraction for containment and management within the fabric. The domain provides a logical unit of fabric allocation that enables the fabric to be partitioned amongst multiple uses, e.g. different business services.

Domains are comprised of tiers, such as a 4-tier application model (web server, application server, business logic, persistence layer) or a single tier monolithic application. Fabric domains contain the free pool of devices available for assignment to tiers.

A tier is a logically associated group of fabric components within a domain that share a set of attributes: usage, availability model or business service mission. Tiers are used to define structure within a domain e.g. N-tier application, and each tier represents a different computing function. The tier structure within a domain is typically defined by a user, such as administrator 20. The hierarchical architecture may provide a high degree of flexibility in mapping customer applications to logical models which run within the fabric environment. The tier is one construct in this modeling process and is the logical container of application resources.

The lowest level, the node level, includes the physical components of the fabric. This includes computing nodes that, as described above, provide operating environments for system applications and enterprise software applications. In addition, the node level may include network devices (e.g., Ethernet switches, load balancers and firewalls) used in creating the infrastructure of network 18. The node level may further include network storage nodes that are network connected to the fabric.

System administrator 20 accesses administration software executing on control node 12 to logically define the hierarchical organization of distributed computing system 10. For example, system administrator 20 may provide organizational data 21 to develop a model for the enterprise and logically define the enterprise fabric. System administrator 20 may, for instance, develop a model for the enterprise that includes a number of domains, tiers, and node slots hierarchically arranged within a single enterprise fabric.

More specifically, system administrator 20 defines one or more domains that each correspond to a single, enterprise application or service, such as a customer relation management (CRM) service. System administrator 20 further defines one or more tiers within each domain that represent the functional subcomponents of applications and services provided by the domain. As an example, system administrator 20 may define a storefront domain within the enterprise fabric that includes a web tier, an application tier and a database tier. In this manner, distributed computing system 10 may be configured to automatically provide web server functions, business application functions and database functions.

For each of the tiers, control node 12 creates a number of "node slot" equal to the maximum number of application nodes 14 that may be deployed. In general, each node slot represents a data set that describes specific information for a corresponding node, such as software resources for a physical node that is assigned to the node slot. The node slots may, for instance, identify a particular software image instance associated with an application node 14 as well as a network address associated with that particular image instance.

In this manner, each of the tiers include one or more node slots that references particular software images instances to boot on the application nodes 14 to which each software image instance is assigned. The application nodes 14 to which control node 12A assigns the image instances temporarily inherit the network address assigned to the image instance for as long as the image instance is deployed on that particular application node. If for some reason the image instance is moved to a different application node 14, control node 12A moves the network address that new application node.

System administrator 20 may further define specific node requirements for each tier of the fabric. For example, the node requirements specified by system administrator 20 may include a central processing unit (CPU) count, a CPU speed, an amount of memory (e.g., RAM), local disk characteristics and other hardware characteristics that may be detected on the individual computing nodes. System administrator 20 may also specify user-defined hardware attributes of the computing nodes, such as whether I/O (like HBA) is required. The user-defined hardware attributes are typically not capable of detection during an automatic inventory. In this manner, system administrator 20 creates a list of attributes that the tier requires of its candidate computing nodes.

In addition to the node requirements described above, system administrator 20 may further define policies that are used when re-provisioning computing nodes within the fabric. System administrator 20 may define policies regarding tier characteristics, such as minimum number of nodes a tier requires, an indication of whether or not a failed node is dynamically replaced by a node from free pool 13, a priority for each tier relative to other tiers, an indication of whether or not a tier allows nodes to be re-provisioned to other tiers to satisfy processing requirements by other tiers of a higher priority or other policies. Control node 12 uses the policy information input by system administrator 20 to re-provision computing nodes to meet tier, processing capacity demands.

After receiving input from system administrator 20 defining the architecture and policy of the enterprise fabric, control node 12 identifies unallocated nodes within free pool 13 that satisfy required node attributes. Control node 12 automatically assigns unallocated nodes from free pool 13 to respective tier node slots of a tier. As will be described in detail herein, in one embodiment, control node 12 may assign computing nodes to the tiers in a "best fit" fashion. Particularly, control node 12 assigns computing nodes to the tier whose node attributes most closely match the node requirements of the tier as defined by administrator 20. The assignment of the computing nodes may occur on a tier-by-tier basis beginning with a tier with the highest priority and ending with a tier with the lowest priority.

As will be described in detail below, control node 12 may automatically add unallocated nodes from free pool 13 to a tier when more processing capacity is needed within the tier, remove nodes from a tier to the free pool when the tier has excess capacity, transfer nodes from tier to tier to meet processing demands, or replace failed nodes with nodes from the free pool. Thus, computing resources, i.e., computing nodes, may be automatically shared between tiers and domains within the fabric based on user-defined policies to dynamically address high-processing demands, failures and other events.

Figure 2:
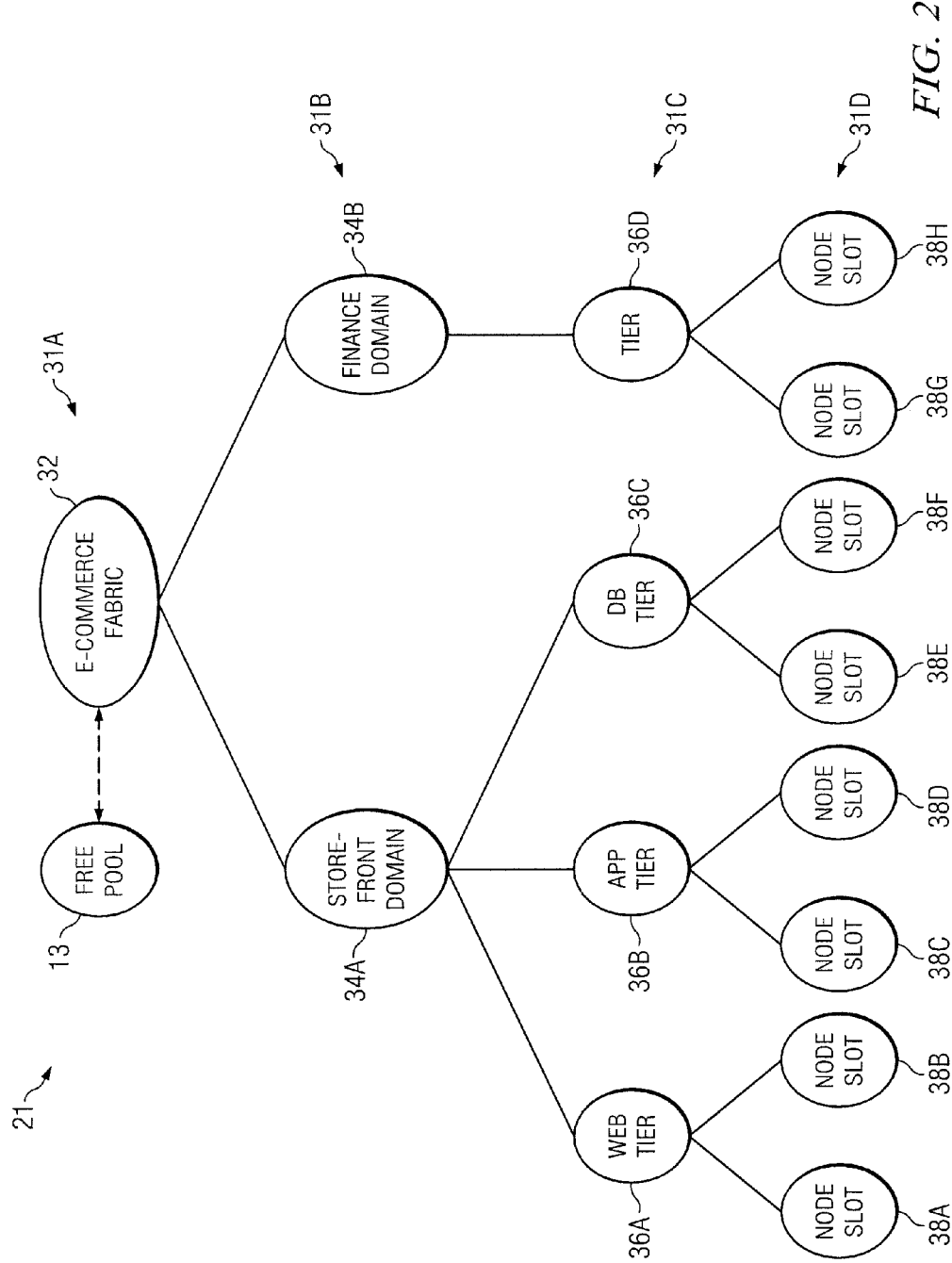
FIG. 2 is a schematic diagram illustrating an example of a model of an enterprise that logically defines an enterprise fabric.

FIG. 2 is a schematic diagram illustrating an example embodiment of organizational data 21 that defines a model logically representing an enterprise fabric in accordance with the invention. In the example illustrated in FIG. 2, control node 12 (FIG. 1) maintains organizational data 21 to define a simple e-commerce fabric 32.

In this example, e-commerce fabric 32 includes a storefront domain 34A and a financial planning domain 34B. Storefront domain 34A corresponds to the enterprise storefront domain and allows customers to find and purchase products over a network, such as the Internet. Financial planning domain 34B allows one or more employees to perform financial planning tasks for the enterprise.

Tier level 31C includes one or more tiers within each domain that represent the functional subcomponents of applications and services provided by the domain. For example, storefront domain 34A includes a web server tier (labeled "web tier") 36A, a business application tier (labeled "app tier") 36B, and a database tier (labeled "DB tier") 36C. Web server tier 36A, business application tier 36B and database tier 36C interact with one another to present a customer with an online storefront application and services. For example, the customer may interact with web server tier 36A via a web browser. When the customer searches for a product, web server tier 36A may interacts with business application tier 36B, which may in turn access a database tier 36C. Similarly, financial planning domain 34B includes a financial planning tier 36D that provides subcomponents of applications and services of the financial planning domain 34B. Thus, in this example, a domain may include a single tier.

Tier level 31D includes one or more logical node slots 38A-38H ("node slots 38") within each of the tiers. Each of node slots 38 include node specific information, such as software resources for an application node 14 that is assigned to a respective one of the node slots 38. Node slots 38 may, for instance, identify particular software image instances within image repository 26 and map the identified software image instances to respective application nodes 14. As an example, node slots 38A and 38B belonging to web server tier 36A may reference particular software images instance used to boot two application nodes 14 to provide web server functions. Similarly, the other node slots 38 may reference software image instances to provide business application functions, database functions, or financial application functions depending upon the tier to which the node slots are logically associated.

Although in the example of FIG. 2, there are two node slots 38 corresponding to each tier, the tiers may include any number of node slots depending on the processing capacity needed on the tier. Furthermore, not all of node slots 38 may be currently assigned to an application node 14. For example, node slot 28B may be associated with an inactive software image instance and, when needed, may be assigned to an application node 14 for deployment of the software image instance.

In this example, organizational data 21 associates free node pool 13 with the highest-level of the model, i.e., e-commerce fabric 32. As described above, control node 12 may automatically assign unallocated nodes from free node pool 13 to at least a portion of tier node slots 38 of tiers 36 as needed using the "best fit" algorithm described above or other algorithm. Additionally, control node 12 may also add nodes from free pool 13 to a tier when more processing capacity is needed within the tier, removes nodes from a tier to free pool 13 when a tier has excess capacity, transfer nodes from tier to tier to meet processing demands, and replace failed nodes with nodes from the free tier.

Although not illustrated, the model for the enterprise fabric may include multiple free node pools. For example, the model may associate free node pools with individual domains at the domain level or with individual tier levels. In this manner, administrator 20 may define policies for the model such that unallocated computing nodes of free node pools associated with domains or tiers may only be used within the domain or tier to which they are assigned. In this manner, a portion of the computing nodes may be shared between domains of the entire fabric while other computing nodes may be restricted to particular domains or tiers.

Figure 3:
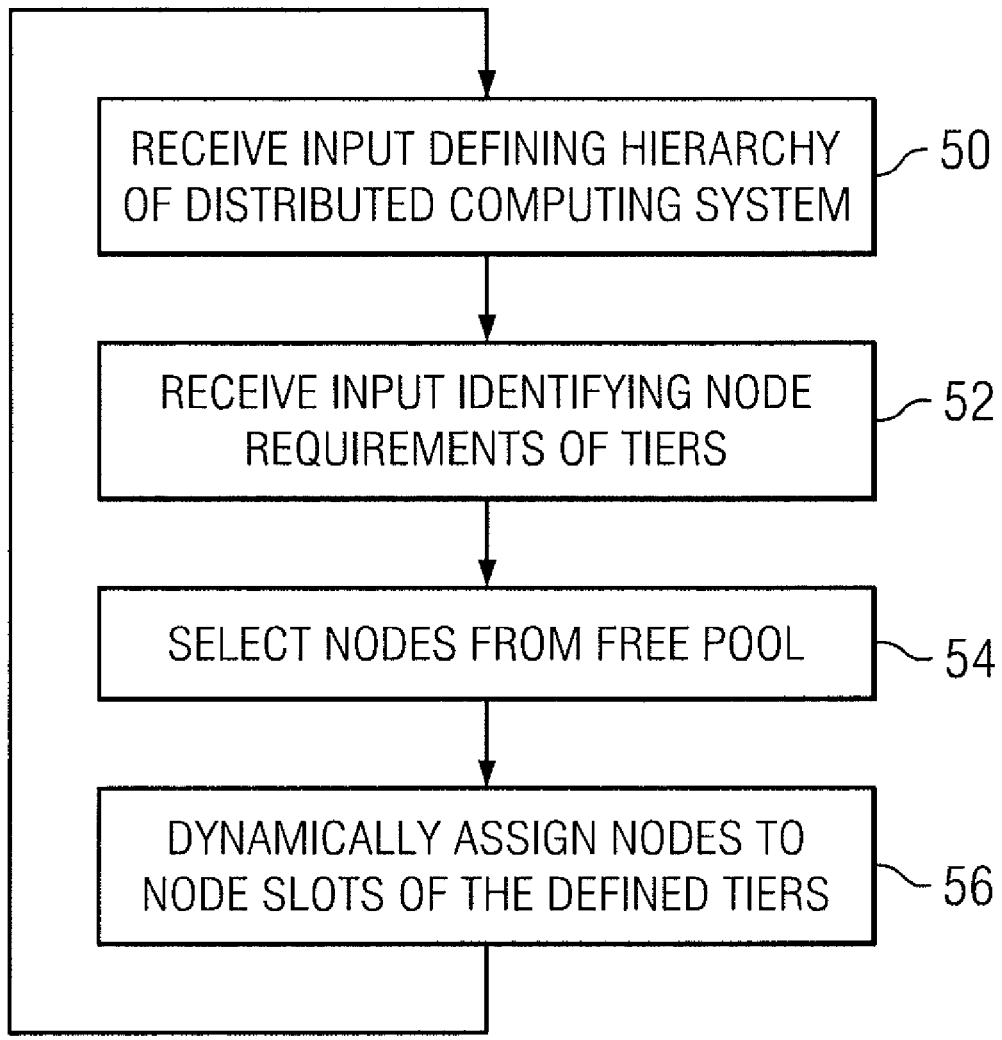
FIG. 3 is a flow diagram that provides a high-level overview of the operation of A control node when configuring the distributed computing system.

FIG. 3 is a flow diagram that provides a high-level overview of the operation of control node 12 when configuring distributed computing system 10. Initially, control node 12 receives input from a system administrator defining the hierarchical organization of distributed computing system 10 (50). In one example, control node 12 receives input that defines a model that specifies number of hierarchically arranged nodes as described in detail in FIG. 2. Particularly, the defined architecture of distributed computing system 10 includes an overall fabric having a number of hierarchically arranged domains, tiers and node slots.

During this process, control node 12 may receive input specifying node requirements of each of the tiers of the hierarchical model (52). As described above, administrator may specify a list of attributes, e.g., a central processing unit (CPU) count, a CPU speed, an amount of memory (e.g., RAM), or local disk characteristics, that the tiers require of their candidate computing nodes. In addition, control node 12 may further receive user-defined custom attributes, such as requiring the node to have I/O, such as HBA connectivity. The node requirements or attributes defined by system administrator 20 may each include a name used to identify the characteristic, a data type (e.g., an integer, long, float or string), and a weight to define the importance of the requirement.

Control node 12 identifies the attributes for all candidate computing nodes within free pool 13 (54). As described above, control node 12 may have already discovered the computing nodes and inventoried the candidate computing nodes to identify hardware characteristics of all candidate computing nodes. Additionally, control node 12 may receive input from system administrator 20 identifying specialized capabilities of one or more computing nodes that are not detectable by the inventory process.

Control node 12 dynamically assigns computing nodes to the node slots of each tier based on the node requirements specified for the tiers and the identified node attributes (56). Population of the node slots of the tier may be performed on a tier-by-tier basis beginning with the tier with the highest priority, i.e., the tier with the highest weight assigned to it. As will be described in detail, in one embodiment, control node 12 may populate the node slots of the tiers with the computing nodes that have attributes that most closely match the node requirements of the particular tiers. Thus, the computing nodes may be assigned using a "best fit" algorithm.

Figure 4:
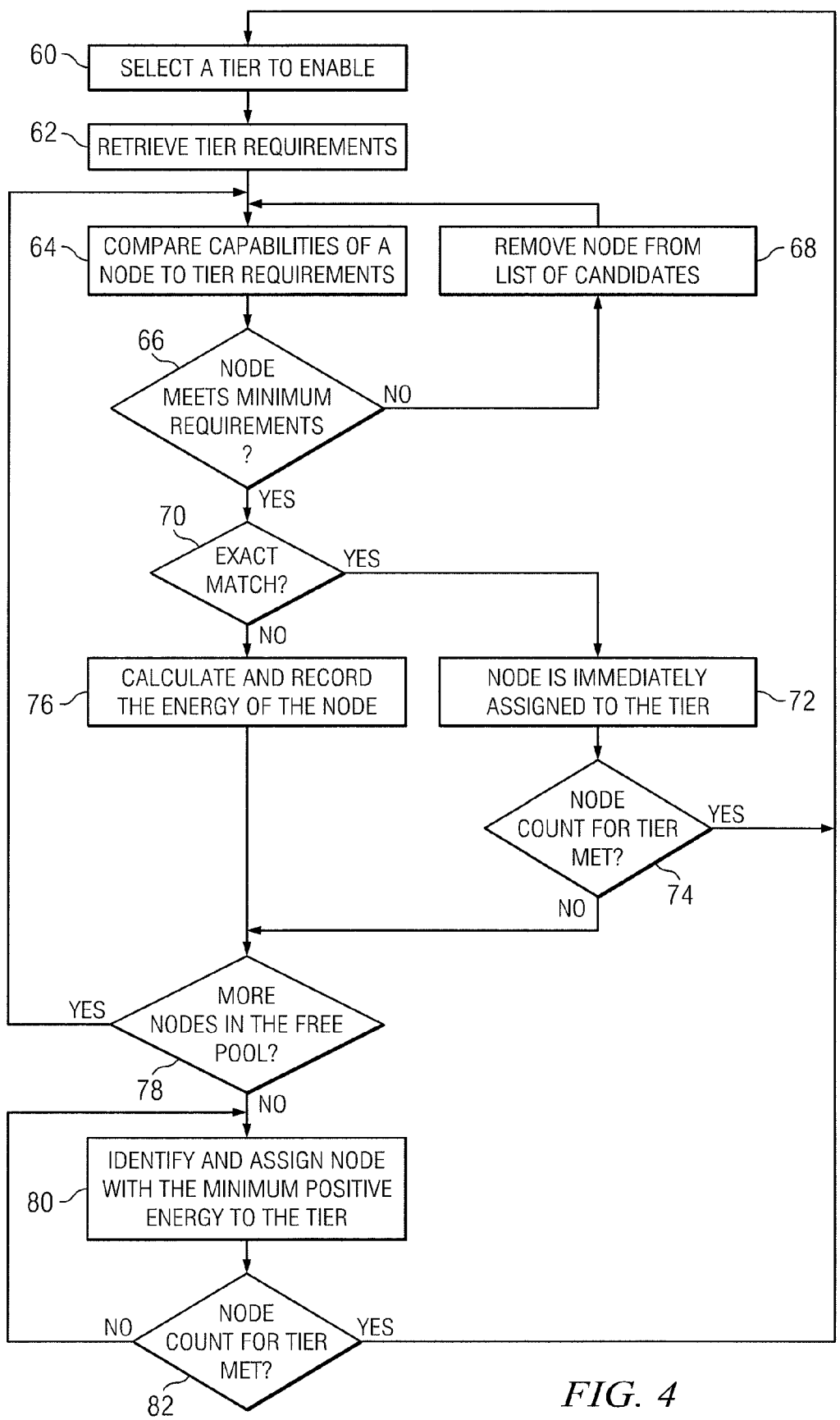
FIG. 4 is a flow diagram illustrating exemplary operation of the control node when assigning computing nodes to node slots of tiers.

FIG. 4 is a flow diagram illustrating exemplary operation of control node 12 when assigning computing nodes to node slots of tiers. Initially, control node 12 selects a tier to enable (60). As described above, control node 12 may select the tier based on a weight or priority assigned to the tier by administrator 20. Control node 12 may, for example, initially select the tier with the highest priority and successively enable the tiers based on priority.

Next, control node 12 retrieves the node requirements associated with the selected tier (62). Control node 12 may, for example, maintain a database that having entries for each node slot, where the entries identify the node requirements for each of the tiers. Control node 12 retrieves the node requirements for the selected tier from the database.

In addition, control node 12 accesses the database and retrieves the computing node attributes of one of the unallocated computing nodes of free pool 13. Control node 12 compares the node requirements of the tier to the node attributes of the selected computing node (64).

Based on the comparison, control node 12 determines whether the node attributes of the computing node meets the minimum node requirements of the tier (66). If the node attributes of the selected computing node do not meet the minimum node requirements of the tier, then the computing node is removed from the list of candidate nodes for this particular tier (68). Control node 12 repeats the process by retrieving the node attributes of another of the computing nodes of the free pool and compares the node requirements of the tier to the node attributes of the computing node.

If the node attributes of the selected computing node meet the minimum node requirements of the tier (YES of 66), control node 12 determines whether the node attributes are an exact match to the node requirements of the tier (70). If the node attributes of the selected computing node and the node requirements of the tier are a perfect match (YES of 70), the computing node is immediately assigned from the free pool to a node slot of the tier and the image instance for the slot is associated with the computing node for deployment (72).

Control node 12 then determines whether the node count for the tier is met (74). Control node 12 may, for example, determine whether the tier is assigned the minimum number of nodes necessary to provide adequate processing capabilities. In another example, control node 12 may determine whether the tier is assigned the ideal number of nodes defined by system administrator 20. When the node count for the tier is met, control node 12 selects the next tier to enable, e.g., the tier with the next largest priority, and repeats the process until all defined tiers are enabled, i.e., populated with application nodes (60).

If the node attributes of the selected computing node and the node requirements of the tier are not a perfect match control node 12 calculates and records a "processing energy" of the node (76). As used herein, the term "processing energy" refers to a numerical representation of the difference between the node attributes of a selected node and the node requirements of the tier. A positive processing energy indicates the node attributes more than satisfy the node requirements of the tier. The magnitude of the processing energy represents the degree to which the node requirements exceed the tier requirements.

After computing and recording the processing energy of the nodes, control node 12 determines whether there are more candidate nodes in free pool 13 (78). If there are additional candidate nodes, control node 12 repeats the process by retrieving the computing node attributes of another one of the computing nodes of the free pool of computing nodes and comparing the node requirements of the tier to the node attributes of the computing node (64).

When all of the candidate computing nodes in the free pool have been examined, control node 12 selects the candidate computing node having the minimum positive processing energy and assigns the selected computing node to a node slot of the tier (80). Control node 12 determines whether the minimum node count for the tier is met (82). If the minimum node count for the tier has not been met, control node 12 assigns the computing node with the next lowest calculated processing energy to the tier (80). Control node 12 repeats this process until the node count is met. At this point, control node 12 selects the next tier to enable, e.g., the tier with the next largest priority (60).

In the event there are an insufficient number of computing nodes in free pool 13, or an insufficient number of computing nodes that meet the tier requirements, control node 12 notifies system administrator 20. System administrator 20 may add more nodes to free pool 13, add more capable nodes to the free pool, reduce the node requirements of the tier so more of the unallocated nodes meet the requirements, or reduce the configured minimum node counts for the tiers.

Figure 5:
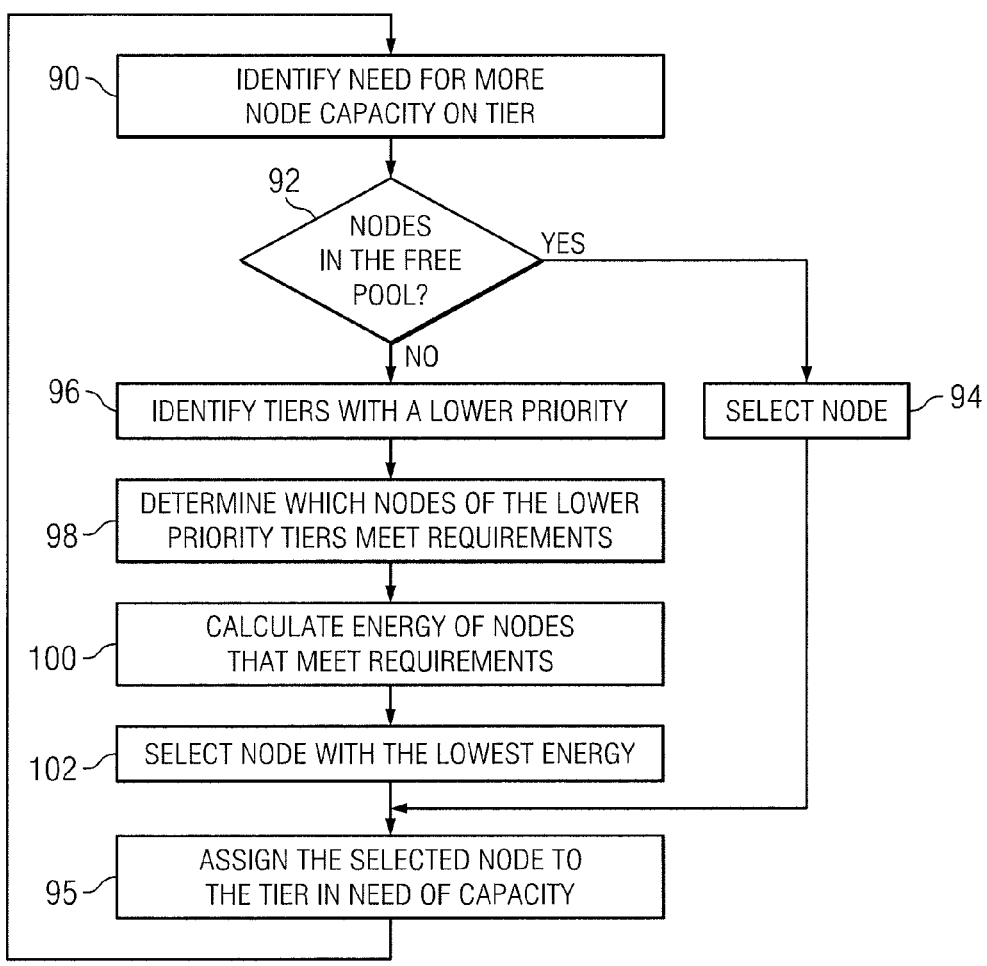
FIG. 5 is a flow diagram illustrating exemplary operation of a control node when adding an additional computing node to a tier to meet additional processing demands.

FIG. 5 is a flow diagram illustrating exemplary operation of control node 12 when adding an additional computing node to a tier to meet increased processing demands. Initially, control node 12 or system administrator 20 identifies a need for additional processing capacity on one of the tiers (90). Control node 12 may, for example, identify a high processing load on the tier or receive input from a system administrator identifying the need for additional processing capacity on the tier.

Control node 12 then determines whether there are any computing nodes in the free pool of nodes that meet the minimum node requirements of the tier (92). When there are one or more nodes that meet the minimum node requirements of the tier, control node 12 selects the node from the free pool based the node requirements of the tier, as described above, (94) and assigns the node to the tier (95). As described in detail with respect to FIG. 4, control node 12 may determine whether there are any nodes that have node attributes that are an exact match to the node requirements of the tier. If an exact match is found, the corresponding computing node is assigned to a node slot of the tier. If no exact match is found, control node 12 computes the processing energy for each node and assigns the computing node with the minimum processing energy to the tier. Control node 12 remotely powers on the assigned node and remotely boots the node with the image instance associated with the node slot. Additionally, the booted computing node inherits the network address associated with the node slot.

If there are no adequate computing nodes in the free pool, i.e., no nodes at all or no nodes that match the minimal node requirements of the tier, control node 12 identifies the tiers with a lower priority than the tier needing more processing capacity (96).

Control node 12 determines which of the nodes of the lower priority tiers meet the minimum requirements of the tier in need of processing capacity (98). Control node 12 may, for example, compare the attributes of each of the nodes assigned to node slots of the lower priority tiers to the node requirements of the tier in need of processing capacity. Lower priority nodes that have the minimum number of computing nodes may be removed from possible tiers from which to harvest an application node. If, however, all the lower priority tiers have the minimum number of computing nodes defined for the respective tier, the lowest priority tier is selected from which to harvest the one or more nodes.

Control node 12 calculates the processing energy of each of the nodes of the lower priority tiers that meet the minimum requirements (100). The energies of the nodes are calculated using the differences between the node attributes and the node requirements of the tier needing additional capacity. Control node 12 selects the computing node with the lowest processing energy that meets the minimum requirements, and assigns the selected computing node to the tier in need of processing capacity (102, 95).

Figure 6:
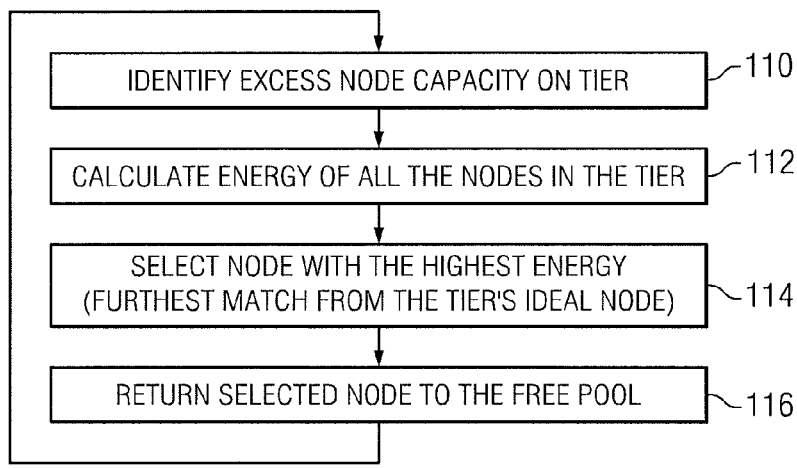
FIG. 6 is a flow diagram illustrating exemplary operation of a control node harvesting excess node capacity from one of the tiers and returning the harvested computing node to the free pool.

FIG. 6 is a flow diagram illustrating exemplary operation of control node 12 when harvesting excess node capacity from one of the tiers and returning the harvested computing node to free pool 13. Initially, control node 12 identifies a tier having excess node capacity (110). Control node 12 may, for example, periodically check the node capacity of the tiers to identify any tiers having excess node capacity. Performing a periodic check and removal of excess nodes increases the likelihood that a capable computing node will be in free pool 13 in the event one of the tiers needs additional node capacity.

When harvesting a node, control node 12 calculates the processing energy of all the nodes in the tier as described above with reference to FIG. 4 (112). Control node 12 identifies the node within the tier with the highest processing energy and returns the identified node to the free pool of nodes (114, 116). As described above, the node with the highest processing energy corresponds to the node whose node attributes are the most in excess the node requirements of the tier.

Returning the node to the free pool may involve remotely powering off the computing node and updating the database to associate the harvested node with free pool 13. In addition, control node 12 updates the database to disassociate the returned node with the node slot to which it was assigned. At this point, the node no longer uses the network address associated with the image instance mapped to the node slot. Control node 12 may, therefore, assign a temporary network address to the node while the node is assigned to free pool 13.

Figure 7:
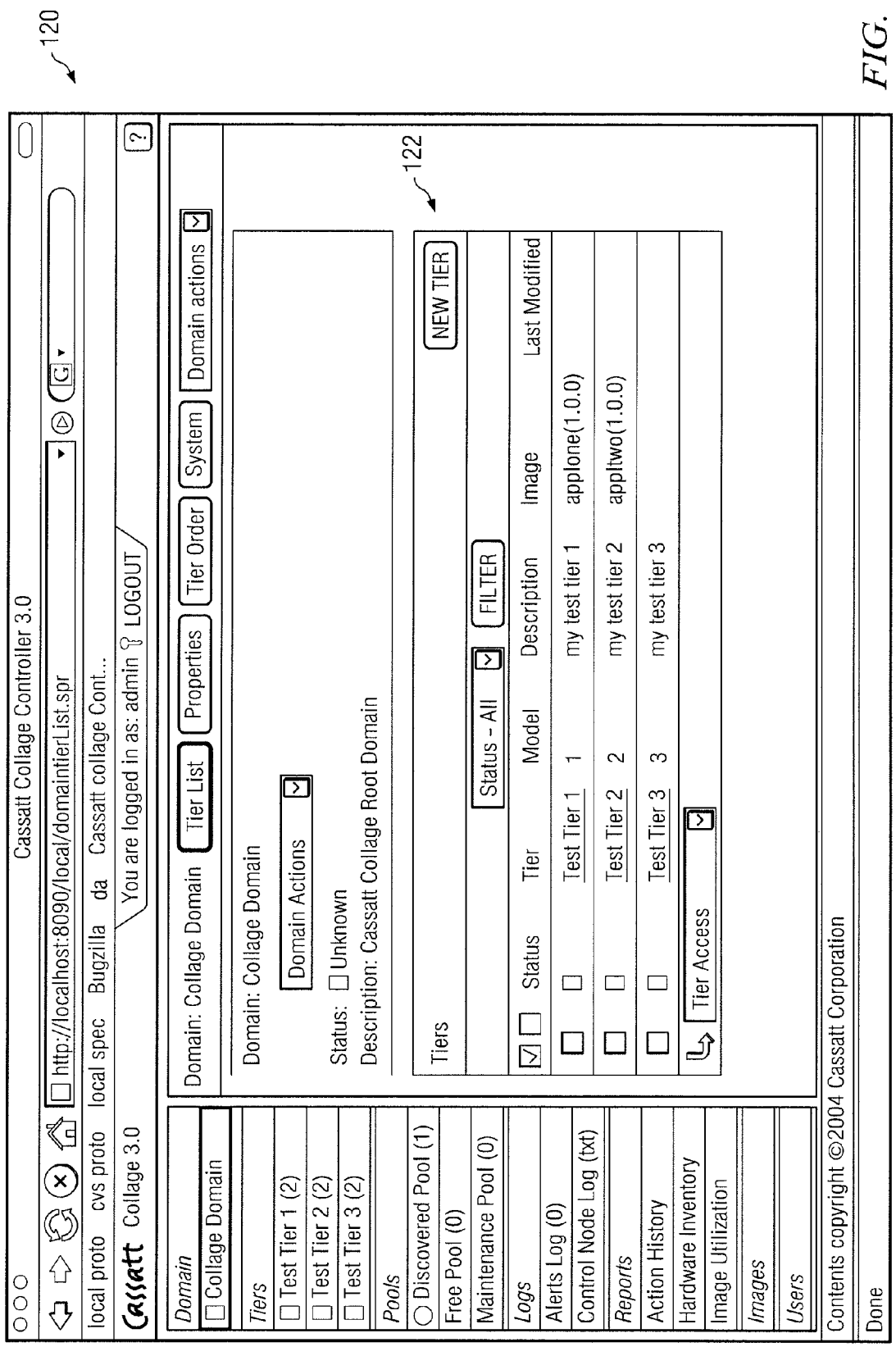
FIG. 7 is a screen illustration of an exemplary user interface for defining tiers in a particular domain.

FIG. 7 is a screen illustration of an exemplary user interface 120 presented by control node 12 with which administrator 20 interacts to define tiers for a particular domain. In the example illustrated in FIG. 7, system administrator 20 has selected the "Collage Domain." User interface 120 presents the tiers that are currently in the selected domain. In the example illustrated, the Collage Domain includes three tiers, "test tier 1," "test tier 2," and "test tier 3." As shown in FIG. 7, in this example, each of the tiers includes two nodes. In addition, user interface 120 lists the type of software image currently deployed to application nodes for each of the tiers. In the example illustrated, image "applone (1.0.0)" is deployed to the nodes of test tier 1 and image "appltwo (1.0.0)" is deployed to the nodes of test tier 2. System administrator 20 may add one or more tiers to the domain by clicking on new tier button 122.

Figure 8:
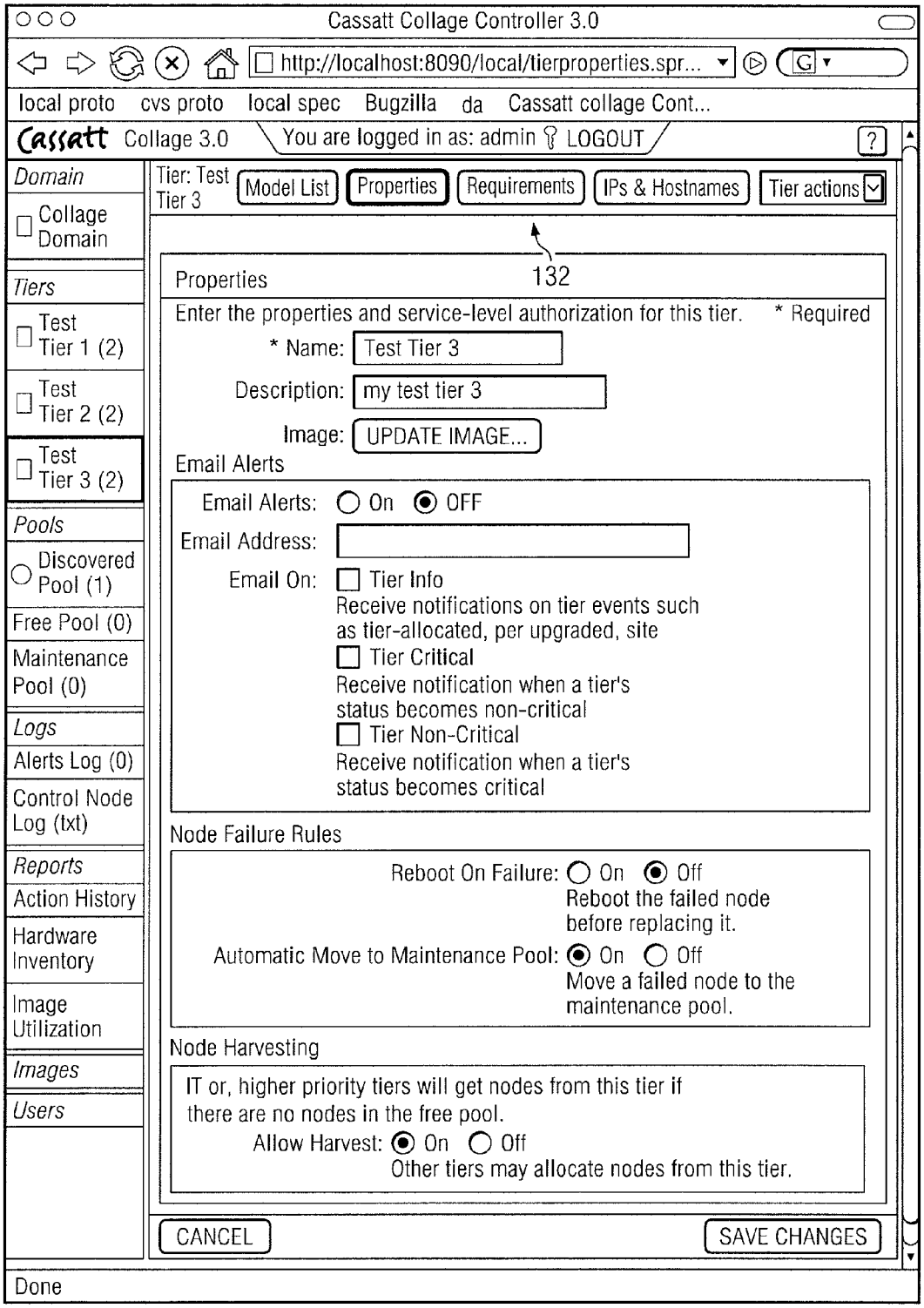
FIG. 8 is a screen illustration of an exemplary user interface for defining properties of the tiers.

FIG. 8 is a screen illustration of an exemplary user interface 130 for defining properties of the tiers. In particular, user interface 130 allows system administrator 20 to input a name for the tier, a description of the tier, and an image associated with the tier. The image associated with the tier refers to a master image from which image instances are generated and deployed to the nodes assigned to the tier.

When configuring a tier, system administrator 20 may elect to activate email alerts. For example, system administrator 20 may activate the email alerts feature in order to receive email alerts providing system administrator 20 with critical and/or non-critical tier information, such as a notification that a tier has been upgraded, a node of the tier has failed or the like. Furthermore, system administrator 20 may input various policies, such node failure rules. For example, system administrator 20 may identify whether control node 12 should reboot a node in case of failure or whether the failed node should automatically be moved to maintenance pool 17. Similarly, system administrator 20 may identify whether nodes assigned to the tier may be harvested by other tiers.

User interface 130 may also allow system administrator 20 to input node requirements of a tier. In order to input node requirements of a tier, system administrator 20 may click on the "Requirements" tab 132, causing user interface 130 to present an input area to particular node requirements of the tier.

Figure 9:
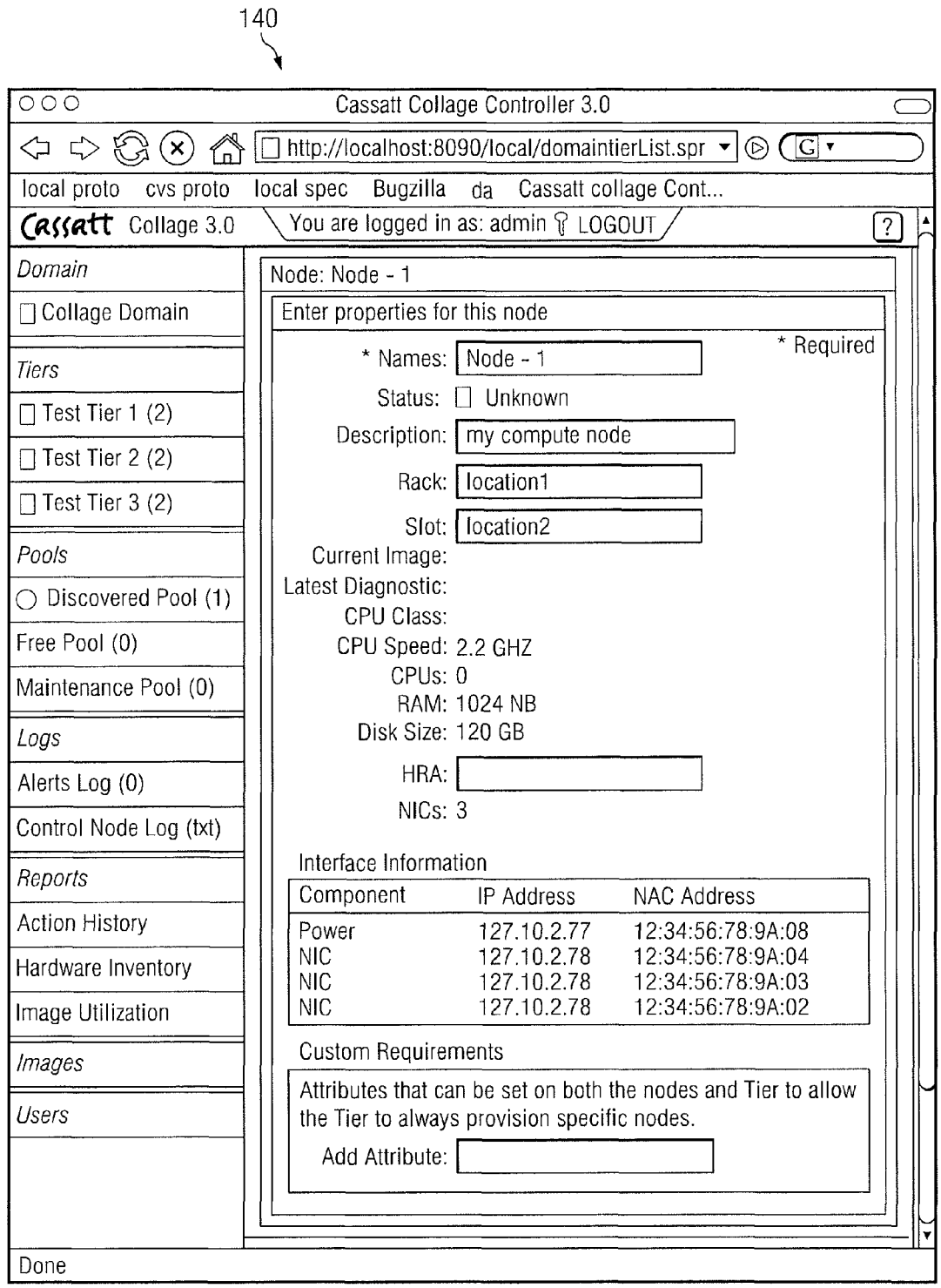
FIG. 9 is a screen illustration of an exemplary user interface for viewing and identify properties of a computing node.

FIG. 9 is a screen illustration of an exemplary user interface 140 for viewing and identify properties of a computing node. User interface 140 allows system administrator 20 to define a name, description, and location (including a rack and slot) of a computing node. In addition the user may specify user-defined properties of a node, such as whether the computing node has I/O HBA capabilities.

User interface 140 also displays properties that control node 12 has identified during the computing node inventory process. In this example, user interface 140 presents system administrator 20 with the a CPU node count, a CPU speed, the amount of RAM, the disk size and other characteristics that are identifiable during the automated node inventory. User interface 140 additionally presents interface information to system administrator 20. Specifically, user interface 140 provides system administrator 20 with a list of components and their associated IP and MAC addresses.

User interface 140 also allows system administrator 20 to define other custom requirements. For example, system administrator 20 may define one or more attributes and add those attributes to the list of node attributes presented to system administrator 20.

Figure 10:
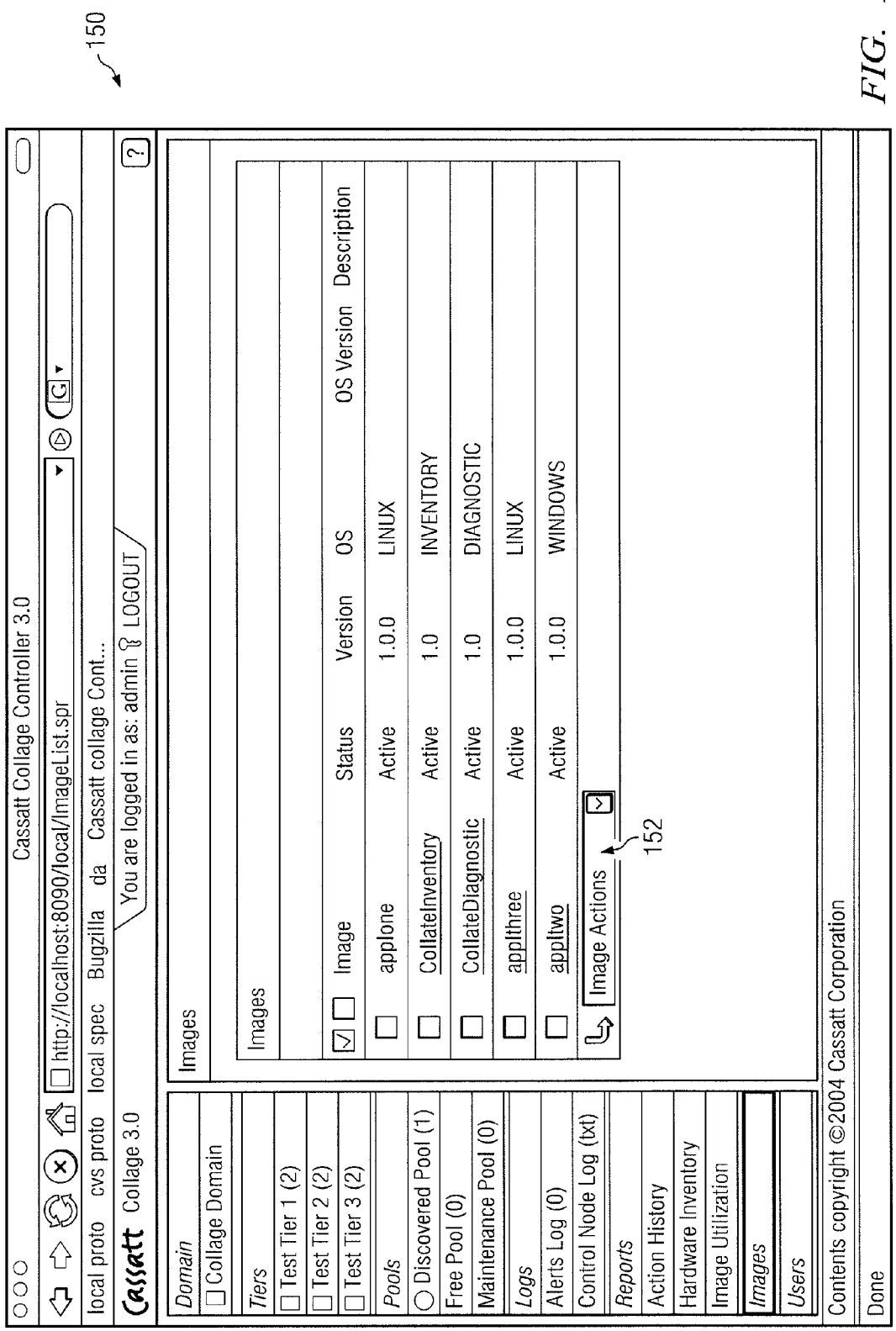
FIG. 10 is a screen illustration of an exemplary user interface for viewing software images.

FIG. 10 is a screen illustration of an exemplary user interface 150 for viewing software images. User interface 150 presents to a system administrator or other user a list of images maintained by control node 12 within image repository 26. The image list further includes the status of each image (i.e., either active or inactive), the version of the image, the operating system on which the image should be run, the operating system version on which the image should be run and a brief description of the image.

System administrator 20 or other user may select an image by clicking on the box in front of the image identifier/name and perform one or more actions on the image. Actions that system administrator 20 may perform on an image include deleting the image, updating the image, and the like. System administrator 20 may select one of the image actions via dropdown menu 152. In some embodiments, user interface 150 may further display other details about the images such as the node to which the images are assigned (if the node status is "active"), the network address associated with the images and the like.

Figure 11:
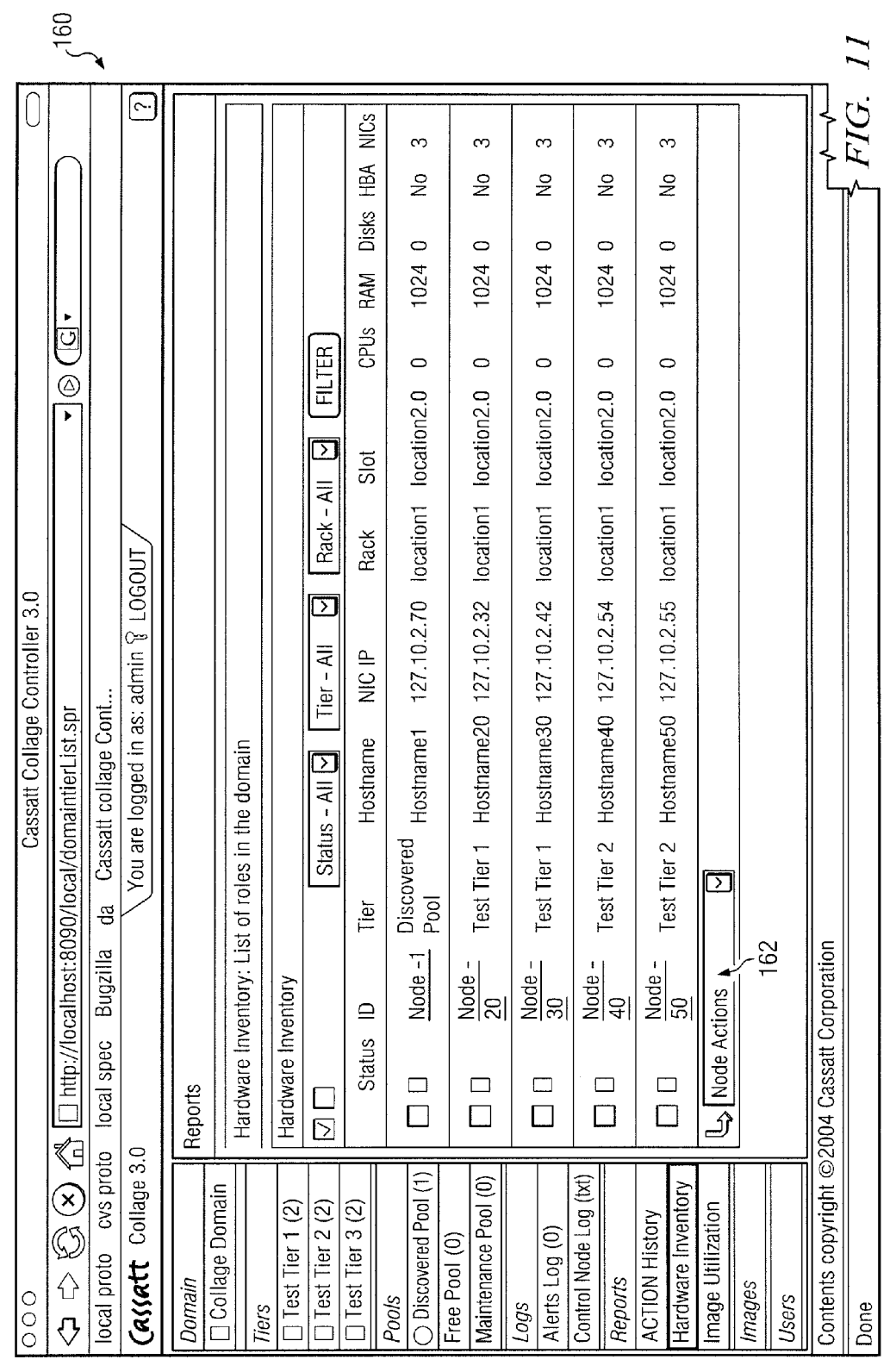

FIG. 11 is a screen illustration of an exemplary user interface 160 for viewing a hardware inventory report. User interface 160 presents to system administrator 20 or other user a list of the nodes that are currently assigned to a domain. System administrator 20 may elect to view the nodes for the entire domain, for a single tier within the domain or for a single rack within a tier.

For each node, user interface 160 presents a node ID, a status of the node, the tier to which the node belongs, a hostname associated with the node, a NIC IP address, a rack location, a slot location, the number of CPU's of the node, the amount of RAM on the node, number of disks on the node, whether the node has I/O HBA, and the number of NICs of the node.

System administrator 20 or other user may select a node by clicking on the box in front of the node identifier/name and perform one or more actions on the node. Actions that system administrator 20 may perform on the node include deleting the node, updating the node attributes or other properties of the node, and the like. System administrator 20 may select one of the node actions via dropdown menu 162.

Figure 12:
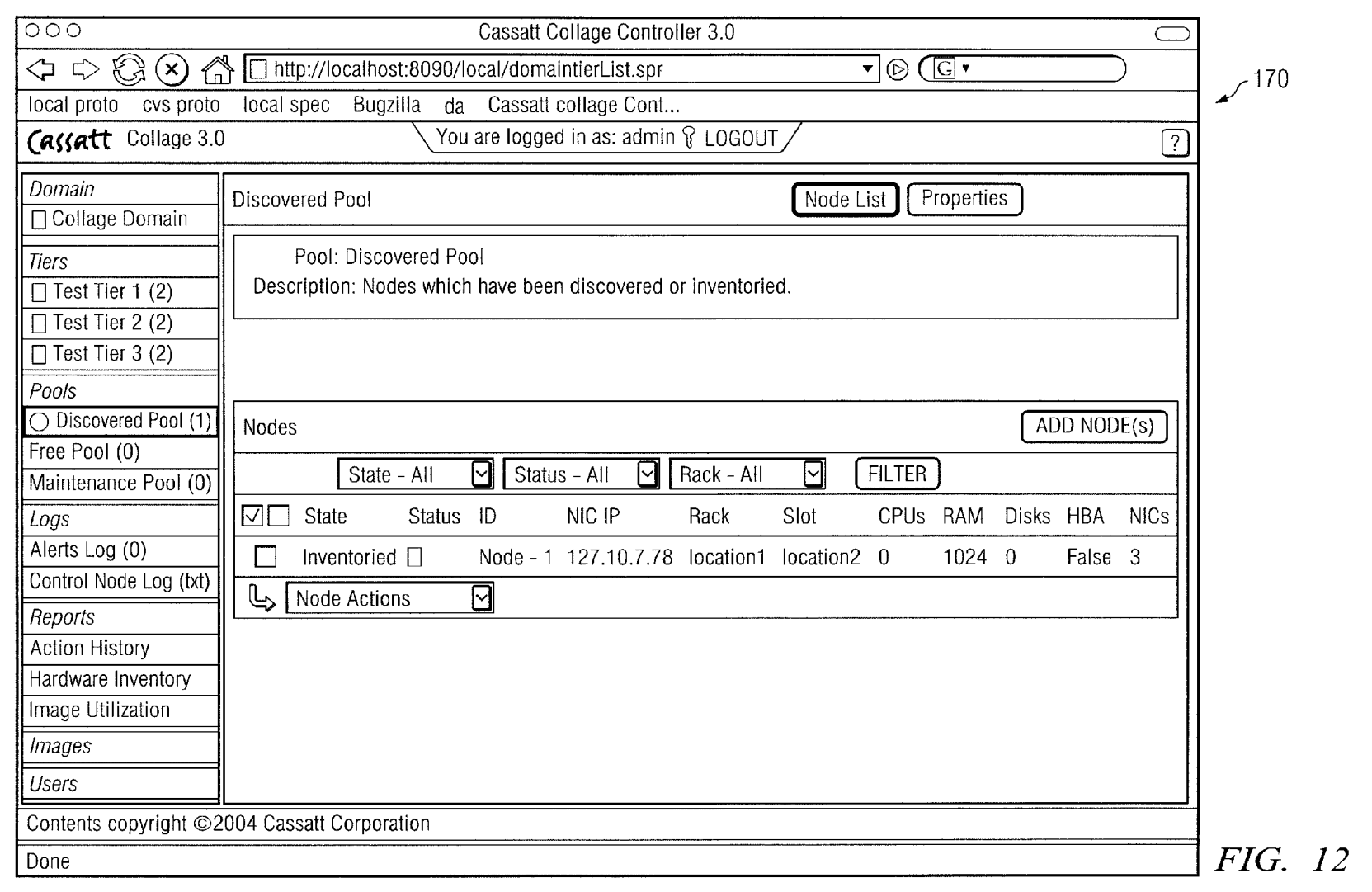

FIG. 12 is a screen illustration of an exemplary user interface 170 for viewing discovered nodes that are located in free pool 13. For each node, user interface 170 presents a node ID, a state of the node, a NIC IP address, a rack location, a slot location, the number of CPU's of the node, the amount of RAM on the node, number of disks on the node, whether the node has I/O HBA, and the number of NICs of the node.

Figure 13:
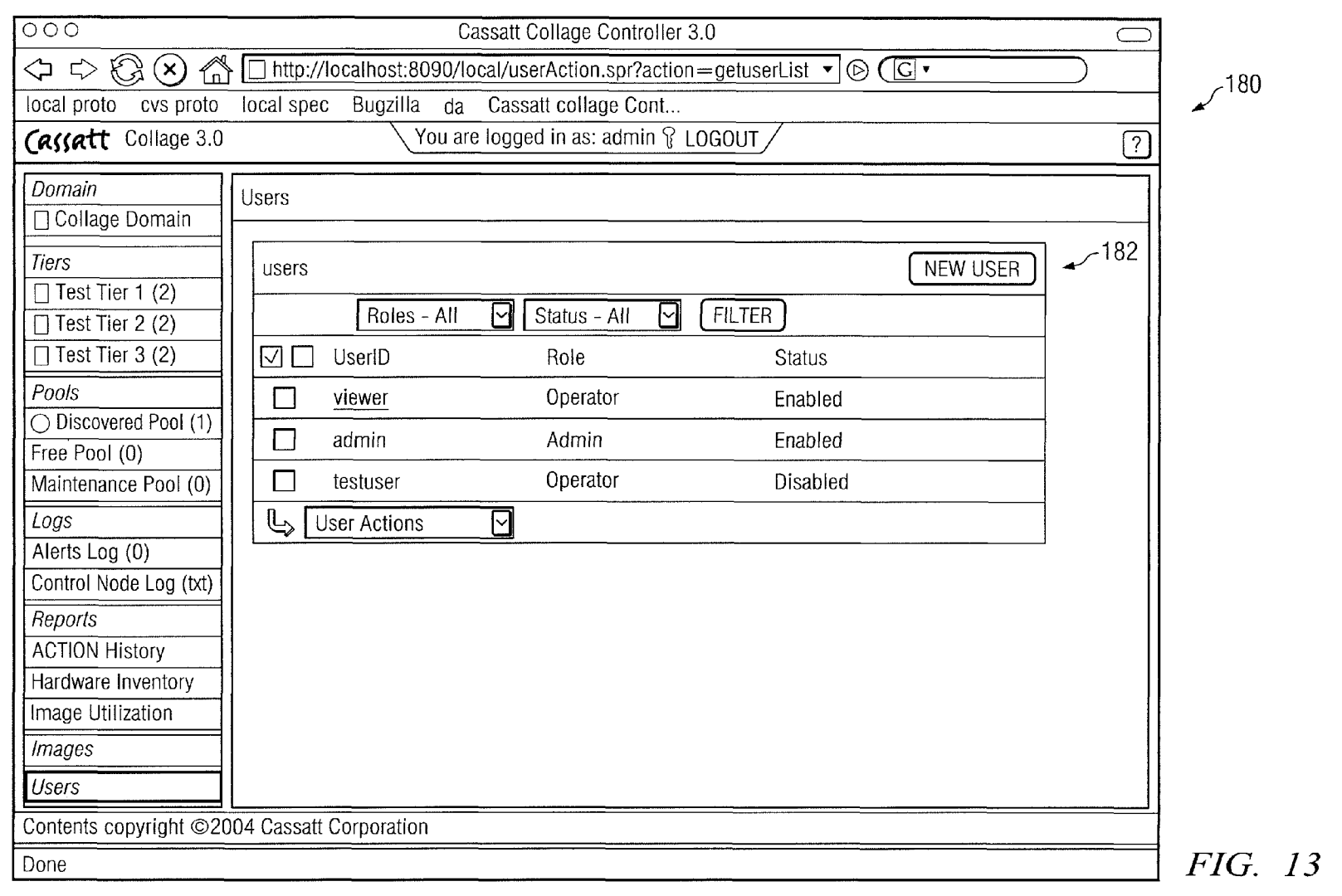

FIG. 13 is a screen illustration of an exemplary user interface 180 for viewing users of distributed computing system 10. User interface 180 presents a list of users as well as the role assigned to each of the users and the status of each of the users. Thus, system administrator 20 may define different roles to each of the users. For example, a user may be either an operator (i.e., general user) or an administrator. System administrator 20 may add a new user to the list of users by clicking on the "New User" button 182.

FIG. 14 is a screen illustration of an exemplary user interface 190 for viewing alerts for distributed computing system 10. For each of the alerts, user interface 190 identifies the severity of the alert, whether the alert has been acknowledged, an object associated with the alert, and event associated with the alert, a state of the alert, a user associated with the alert and a date associated with the alert.

System administrator 20 or other user may select an alert by clicking on the box in front of the logged alert and perform one or more actions on the logged alert. Actions that system administrator 20 may perform include deleting the alert, changing the status of the alert, or the like. System administrator 20 may specify the log actions via dropdown menu 192.

Various embodiments of the invention have been described. These and other embodiments are within the scope of the following claims.

The invention claimed is:

1. A method comprising:
identifying node requirements of a first tier of a plurality of tiers wherein each tier of the plurality of tiers has a different computing function;
retrieving attributes of a set of computing nodes, each node of the set of computing nodes comprising a processor;
comparing the attributes of the set of computing nodes to the node requirements of the first tier;
calculating a processing energy for each node of the set of computing nodes based on differences between the attributes of the set of computing nodes and the node requirements of the first tier;
selecting at least one node of the set of computing nodes having a lowest positive processing energy; and
assigning the selected at least one node to at least one node slot of the first tier.

2. The method of claim 1, wherein the node requirements include at least one of a central processing unit (CPU) count, a CPU speed, an amount of memory or local disk characteristics.

3. The method of claim 1, further comprising deploying at least one software image on the selected at least one node.

4. The method of claim 3, wherein each of the at least one software image comprises an operating system, boot code, middleware, and application files such that the each of the at least one software image provides a computing environment for execution of user software applications.

5. The method of claim 1, further comprising:
determining whether the attributes for each node of the set of computing nodes meet a set of minimum node requirements of the first tier; and
removing each node whose attributes do not meet the minimum node requirements of the first tier from the set of computing nodes.

6. The method of claim 1, wherein:
each tier of the plurality of tiers is associated with a priority;
the set of computing nodes comprises nodes assigned to a set of tiers of the plurality of tiers, wherein each tier of the set of tiers has a lower priority than the first tier; and
the selected at least one node is assigned to the at least one node slot of the first tier by transferring the selected at least one node from a second tier to the first tier, the second tier having a lower priority than the first tier.

7. The method of claim 1, wherein the set of computing nodes is a set of unallocated computing nodes.

8. A system comprising at least one processor, the at least one processor configured to:
identify node requirements of a first tier of a plurality of tiers wherein each tier of the plurality of tiers has a different computing function;
retrieve attributes of a set of computing nodes, wherein each node of the set of computing nodes comprises a processor;
compare the attributes of the set of computing nodes to the node requirements of the first tier;
calculate a processing energy for each node of the set of computing nodes based on differences between the attributes of the set of computing nodes and the node requirements of the first tier;
select at least one node of the set of computing nodes having a lowest positive processing energy; and
assign the selected at least one node to at least one node slot of the first tier.

9. The system of claim 8, wherein the node requirements include at least one of a central processing unit (CPU) count, a CPU speed, an amount of memory or local disk characteristics.

10. The system of claim 8, wherein the at least one processor is further configured to deploy at least one software image on the selected at least one node.

11. The system of claim 10, wherein each of the at least one software image comprises an operating system, boot code, middleware, and application files such that the each of the at least one software image provides a computing environment for execution of user software applications.

12. The system of claim 8, wherein the at least one processor is further configured to:
determine whether the attributes for each node of the set of computing nodes meet a set of minimum node requirements of the first tier; and
remove each node whose attributes do not meet the minimum node requirements of the first tier from the set of computing nodes.

13. The system of claim 8, wherein:
- each tier of the plurality of tiers is associated with a priority;
- the set of computing nodes comprises nodes assigned to a set of tiers of the plurality of tiers, wherein each tier of the set of tiers has a lower priority than the first tier; and
- the at least one processor assigns the selected at least one node to the at least one node slot of the first tier by causing the selected at least one node to be transferred from a second tier to the first tier, the second tier having a lower priority than the first tier.

14. The system of claim 8, wherein the set of computing nodes is a set of unallocated computing nodes.

15. At least one computer readable medium comprising instructions that, when executed by at least one processor, are configured to:
- identify node requirements of a first tier of a plurality of tiers wherein each tier of the plurality of tiers has a different computing function;
- retrieve attributes of a set of computing nodes, wherein each node of the set of computing nodes comprises a processor;
- compare the attributes of the set of computing nodes to the node requirements of the first tier;
- calculate a processing energy for each node of the set of computing nodes based on differences between the attributes of the set of computing nodes and the node requirements of the first tier;
- select at least one node of the set of computing nodes having a lowest positive processing energy; and
- assign the selected at least one node to at least one node slot of the first tier.

16. The at least one computer readable medium of claim 15, wherein the node requirements include at least one of a central processing unit (CPU) count, a CPU speed, an amount of memory or local disk characteristics.

17. The at least one computer readable medium of claim 15, wherein the instructions are further configured to deploy at least one software image on the selected at least one node.

18. The at least one computer readable medium of claim 17, wherein each of the at least one software image comprises an operating system, boot code, middleware, and application files such that the each of the at least one software image provides a computing environment for execution of user software applications.

19. The at least one computer readable medium of claim 15, wherein the instructions are further configured to:
- determine whether the attributes for each node of the set of computing nodes meet a set of minimum node requirements of the first tier; and
- remove each node whose attributes do not meet the minimum node requirements of the first tier from the set of computing nodes.

20. The at least one computer readable medium of claim 15, wherein:
- each tier of the plurality of tiers is associated with a priority;
- the set of computing nodes comprises nodes assigned to a set of tiers of the plurality of tiers, wherein each tier of the set of tiers has a lower priority than the first tier; and
- the instructions are configured to assign the selected at least one node to the at least one node slot of the first tier by causing the selected at least one node to be transferred from a second tier to the first tier, the second tier having a lower priority than the first tier.

21. The at least one computer readable medium of claim 15, wherein the set of computing nodes is a set of unallocated computing nodes.

\* \* \* \* \*